Figure 1:
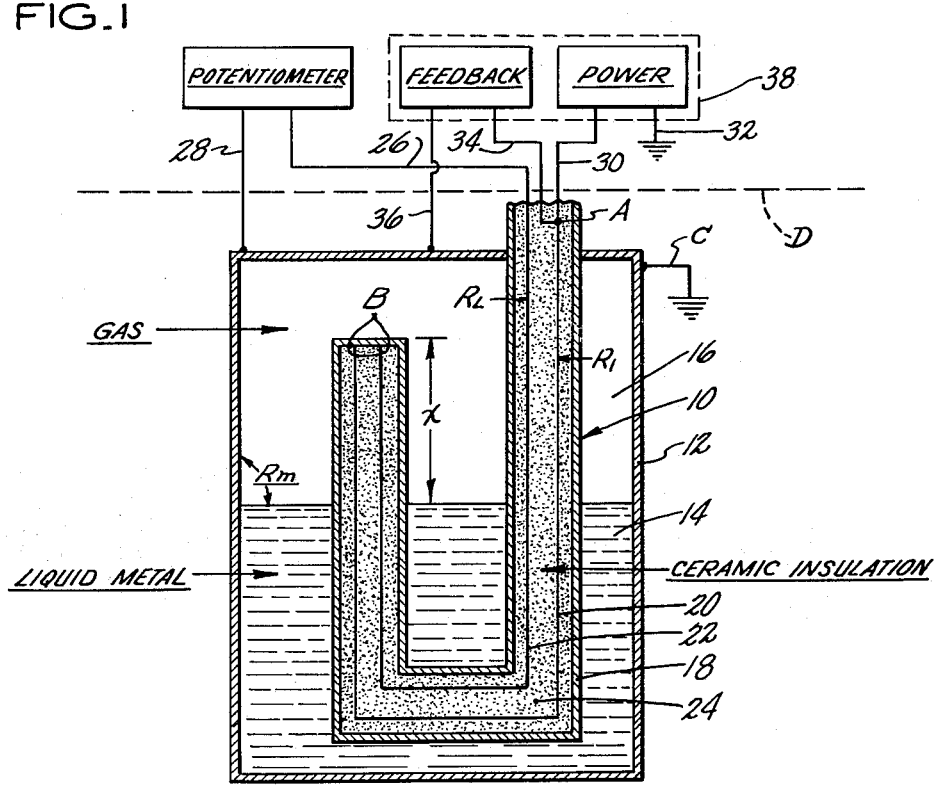

May 18, 1965 R. R. HOLMES 3,183,715

LIQUID METAL PROBE

Filed Sept. 10, 1962

INVENTOR
ROBERT R. HOLMES
BY M. B. Tasker
ATTORNEY

United States Patent Office 3,183,715
Patented May 18, 1965

3,183,715
LIQUID METAL PROBE
Robert R. Holmes, Hamden, Conn., assignor to United
Aircraft Corporation, East Hartford, Conn., a corporation of Delaware
Filed Sept. 10, 1962, Ser. No. 222,263
8 Claims. (Cl. 73—304)

This invention relates to measuring devices for indicating the level of a liquid metal which is confined in a metal container. Such devices are sometimes referred to as liquid level probes.

Among the physical properties of liquid metals that can be used for level detection are magnetic permeability, electric susceptibility, heat conduction, velocity of sound, buoyancy, and electrical conduction. In the first mentioned, the magnetic permeability is utilized in an inductance probe which is partially submerged in the liquid metal. This probe consists of a coil which is protected from the liquid metal by a well. As the liquid metal level rises around the coil, flux linkage through the liquid metal changes the reactance of the coil and unbalances an A.-C. bridge. These probes are non-linear, they are temperature dependent, they are subject to drift, and the insulation requirements of the coil limits the maximum operating temperatures. Further, they are very sensitive to A.-C. pickup.

The electric susceptibility is utilized by a capacitance probe operating in a manner analogous to the induction probe and has most of the disadvantages of the inductance probe.

The heat conductivity of the liquid metal is utilized in an electrically heated probe which is partially submerged in liquid metal. Since the submerged portion of the probe is cooled by the liquid metal, and since the electrical resistance of the heater is a function of its temperature, the heater resistance is directly related to the liquid metal level. This type of probe has a slow response. A typical probe of this type which was tested required 60 seconds to indicate 90% of a step change in level.

The acoustical properties of the liquid metal can be utilized by measuring the time it takes an ultrasonic pulse to travel down a transmitter. This type of probe has temperature limitations, among others, which make it unsuitable for liquid metal applications.

The buoyancy of the liquid metal can be used to determine its level by the use of a ferromagnetic float that is sensed with an inductance coil. This probe offers no real advantage over the induction probe and most of the disadvantages are retained.

Level can be measured with a radioactive source and radiation detectors but this type of probe is generally unacceptable because of the complexity of the detection system, lack of accuracy, and the inability to operate in the presence of strong background radiation.

Electrical conductivity of the liquid metal has been used to actuate a spark plug or resistance type probe in which the probe consists of an electrically conducting rod which is insulated from the liquid metal container. This gives only a one-point indication of liquid level, and the insulation has a tendency to short out in the presence of liquid metal vapors. From the above it will be apparent that the accurate gauging of the level of liquid metal presents some unusual problems, especially if the liquid metal is a high temperature, corrosive metal.

It is an object of this invention to provide an improved resistance type probe which is capable of giving a continuous, accurate reading of liquid level over a designed range, in which the insulation limitations are overcome, and in which temperature compensation is provided in the external circuitry.

A further object of this invention is to provide a liquid level probe which is extremely resistant to high temperatures and liquid metal corrosion, and which will have a reproducible drift-free calibration at all temperatures.

A further object of the invention is to provide a probe for use with corrosive, high-temperature liquid metals which has an accurracy of one percent over a temperature range of 1000° F., which has no moving parts which can be immobolized by corrosion and, since the probe usually cannot be serviced after installation, a probe which has a high degree of reliability.

A further object of the invention is the provision of a probe of this type which can be calibrated in the laboratory prior to installation.

A still further object of the invention is to provide a J probe in which the wires in the probe are insulated from the clad by powdered ceramic and the clad is swaged to compress the insulation, so that the probe can be bent into shape with no welds which will operate continuously below the surface of the liquid metal and in which all welding of the leads to the clad of the J is eliminated except at the end closure.

A still further object of the invention is to provide an improved D.-C. resistance probe of the J type, which will operate at currents low enough to eliminate excessive electrical heating in the lead wires.

Figure 2:
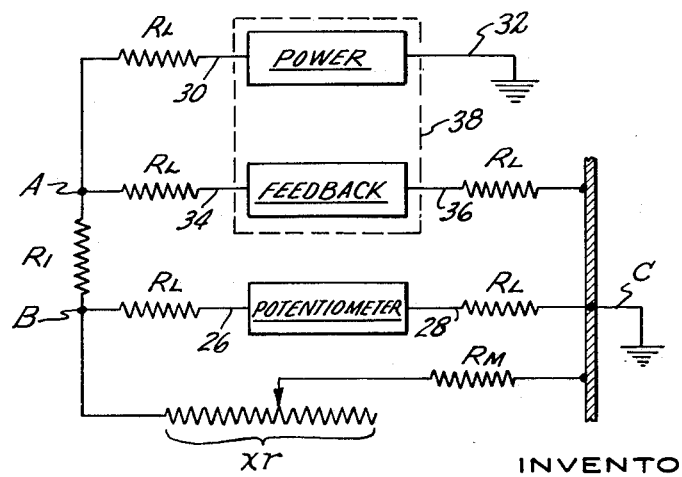

These and other objects and advantages of the invention will be apparent or will be pointed out in connection with the following detailed description of a preferred embodiment of the invention shown in the accompanying drawing in which FIG. 1 is a diagrammatic sectional view of the improved probe; and FIG. 2 is a schematic circuit diagram of FIG. 1.

The improved probe utilizes a swaged construction similar to that of a metal clad thermocouple. The clad, in the form of a pipe, may be either AMS 5573 stainless steel or columbium-zironium (99Cb-IZr) alloy or any metal which will contain liquid metal. Because of the improvements made in the external circuit design, it is made unnecessary to weld any of the probe wires to the base of the J, thus making it possible to eliminate all welds at the base of the J and to fabricate the probes as a straight length of clad material which is bent into the J shape after swaging.

The J probe is installed so that the minimum liquid level to be measured will correspond to the bottom of the J and the maximum level will correspond to the tip of the unsupported leg. Above the surface of the liquid metal the unsupported leg of the probe makes no contact electrically with either the liquid metal or the container.

The probe is operated by passing a constant D.C. current through the portion of the unsupported leg of the probe which is not submerged in liquid metal. This is accomplished by using one of two internal wires in the probe and an external ground wire as current leads to a D.-C. power supply. The voltage drop developed across the length of unsupported portion of the probe which is above the liquid metal, due to this current, is a simple function of liquid level and is measured by using the second wire in the probe and a second external ground wire as potential leads to a high impedance millivolt detector.

Referring to the drawings, the J probe, generally indicated by numeral 10, is installed in a metal container 12 containing a body 14 of high temperature corrosive liquid metal such as sodium, sodium-potassium, lithium, or the like. In some instances, a cover gas 16 may be provided above the liquid. Casing 12 is grounded at C.

The probe may consist of a metal clad 18 containing two AMS 5573 stainless steel or columbium alloy wires 20 and 22 which may be, for example, of a diameter of .013". The clad is made of the same material as the probe wires. The wires are insulated from the clad by ceramic bead insulation 24 which has been compressed about the wires by swaging the clad down from an initial outside diameter, for example, 0.293 with 0.022" wall to a finished probe of approximately 0.250 outside diameter or 0.089 with 0.010 wall to a finished probe of .062 outside diameter. With a probe constructed in this manner, it is almost impossible for the internal wires to short.

The supporting leg of the J probe extends through an aperture in the cover of the casing and is welded into the casing. The unsupported end of the probe is provided with a cap weld at B to which the ends of the wires 20 and 22 are welded.

Wire 22 of the probe is connected by a lead 26 to a millivolt potentiometer, the other lead 28 of which is grounded on the casing 12. The other lead 20 of the probe is connected by a lead 30 to a source of power which is grounded by a lead 32. By reason of the fine high-resistance wires 20 and 22 contained in the probe, it is possible to provide temperature compensation external of the probe. This is accomplished by a voltage feedback having a lead 34 which is connected to the probe wire 20 at A and a lead 36 which is grounded on the casing 12.

It will be understood that if the probe is constructed with large diameter heavy wall tubing a high current will be required to obtain a satisfactory output from the probe. Applicant, by reason of the swaged construction with the crushed ceramic insulation within a clad which has been swaged down to a small diameter with a thin wall, obtains a satisfactory probe output with a small current. Operation with a low current results in very little voltage drop across the liquid metal and the tank ($R_m$), so the signal ground wire 28 can be connected to the tank rather than to the clad at the base of the probe. This eliminates the need for any welds between the wires and the internal portion of the clad and greatly simplifies the construction of the probe. Further, the use of a low current allows the use of small diameter, high resistance wires without obtaining excessive electrical heating. Applicant uses the resulting large voltage drop across current lead 20 to operate an external feedback network which provides a much higher degree of temperature compensation than can be obtained by any other technique.

All wires above the dash line D can be made of any metal having good electrical conductivity such as copper and the resistance of these leads is shown on the schematic diagram as $R_L$. The wires below the dash line must be made of the same metal as the probe. It will be evident that, if the voltage drop is held constant across a portion of the J probe circuit which is in the same temperature environment as the probe itself and which is made of the same material as the clad of the probe, the output from the probe will be temperature independent.

The power supply utilized and indicated within the dash line box 38 is manufactured by the Video Instrument Company and provides automatic temperature compensation which allows a constant voltage to be maintained between any two points in the output circuit. The particular power supply shown herein is designated SR1000EM in the Video Instruments Division of Endevco Corporation catalog 4–2 on page 2.

In theory, since the potentiometer draws no current $$V_{AC} = I(R_1 + xr + R_m)$$
$$V_{BC} = I(R_m + xr)$$

Therefore since $R_m \ll xr$ and $xr \ll R_1$ $$\frac{V_{BC}}{V_{AC}} = \frac{R_m + xr}{R_1 + xr + R_m} \approx \frac{xr}{R_1}$$

and since $r$ and $R_1$ are the same metal, $$\frac{r}{R_1}$$

is independent of temperature.

Therefore, $$V_{BC} = \frac{V_{AC} r}{R_1} x = Cx$$

where C is a calibration constant independent of temperature
where:

$r$ = resistance per unit length of probe
$x$ = length of probe above liquid metal
$R_L$ = various lead resistances
$R_1$ = resistance of the portion of the current lead that is in the temperature zone
$R_m$ = resistance of liquid metal and container
$V_{AC}$ = voltage which is held constant by the feedback mechanism
$V_{BC}$ = output signal of probe
$I$ = current through probe The operation of the probe will be clear when it is considered that current from the power source passes through lead 30, probe wire 20 to point B at the end of the probe. It then passes through the clad of the probe to the surface of the liquid metal, this distance being indicated as $x$ on the drawing. It then passes through the liquid metal and the container to ground. The feedback network is connected between points A and C, so a constant voltage between these points is maintained at all temperatures. The potentiometer is connected by lead 26 to probe wire 22 and by lead 28 to the liquid metal containment tank and consequently as the D.C. current from the power supply passes through the portion $x$ of the unsupported leg of the probe, which is above the liquid metal, the potentiometer indicates the voltage drop across this length of the probe as a measure of liquid level.

As a result of this invention, it will be evident that a probe for liquid metal has been provided which is accurate, reliable, extremely resistant to high temperatures and liquid corrosion, and one which will have a reproducible drift-free calibration at all temperatures within its design range. A further advantage of the probe is the ability to calibrate the probe prior to installation because in many cases calibration is impossible following installation.

It will also be noted that by reason of the swaged construction of the J probe and the fine, high-resistance wires in the swaged tube, it is possible to provide temperature compensation in the external circuitry of the probe, and to avoid all welds internally of the probe to the clad structure.

While only one embodiment of the invention has been shown herein, it will be understood that various changes may be made in the construction and arrangement of the parts without departing from the scope of the invention as defined in the following claims.

I claim:

1. Apparatus for gauging the level of an electrically conducting liquid including a J probe, means for supporting said probe with the shorter leg traversing the surface of the liquid, said probe comprising a metal tube open at the upper end of its longer leg above the surface of the liquid and having a metal closure for the end of its shorter leg, said tube being free of welds in the portion immersed in the liquid, a pair of leads extended through the open end of said tube and electrically connected to said end closure, means for insulating said leads from said tube and from each other throughout the length of the tube, means including one of said leads for passing a constant D.-C. current through the portion of said shorter leg which is above the liquid surface, and means including the other lead of said pair for indicating the voltage developed by the passage of said current through said portion as a measure of liquid level.

2. Apparatus for gauging the level of a body of conducting liquid within a metal container including a J probe supported on said container at the upper end of its longer leg with its shorter leg traversing the surface of the liquid, said probe comprising a thin-wall metal tube open at the upper end of its longer leg externally of said container and having a metal closure for the end of its shorter leg, a pair of fine high resistance leads extended through the open end of said tube and electrically connected to said end closure, means for insulating said leads from said tube and from each other throughout the length of said tube, means including one of said leads for passing a D.-C. current through the portion of said shorter leg which is above the liquid surface, means including said other lead for indicating the voltage drop across said portion as a measure of liquid level, and means external of the probe for compensating for variations in temperature affecting the probe.

3. In combination, an electrically conducting vessel adapted to contain liquid metal at different levels, means for indicating the liquid level in said vessel at any of said levels including a J probe extended into said vessel with its short leg normally protruding above the surface of the liquid metal, said probe comprising a metal tube supported by said vessel having its long leg open at its end externally of said vessel and having the end of its short leg capped, said tube being free of welds in the portion immersed in the liquid, two leads extended into said probe through said open end and electrically connected to said cap, said leads being insulated from said metal tube and from each other, a constant D.-C. power source having two leads, one of which is electrically connected to said vessel and the other of which is connected to one of said probe leads, and a voltage detector having two leads, one of which is connected to the other lead of said probe and the other of which is connected electrically to said vessel.

4. In combination, an electrically conducting vessel adapted to contain liquid metal at different levels, means for indicating the liquid level in said vessel at any of said levels including a J probe extended into said vessel with its short leg normally protruding above the surface of the liquid metal, said probe comprising a metal tube supported by said vessel having its long leg open at its end externally of said vessel and having the end of its short leg capped, said tube being free of welds in the portion immersed in the liquid, two leads extended into said probe through said open end and electrically connected to said cap, said leads being insulated from said metal tube and from each other, a constant D.-C. power source having two leads, one of which is electrically connected to said vessel and the other of which is connected to one of said probe leads, and means for measuring the voltage drop developed across the portion of said probe which is not shunted by said vessel, due to the current from said power source, including a high impedance millivolt potentiometer connected between said vessel and the other lead of said probe.

5. In combination, an electrically conducting vessel adapted to contain liquid metal at different levels, means for continuously indicating the liquid level in said vessel between an upper and a lower level including a temperature compensated J probe extended into said vessel with its short leg normally protruding above the surface of the liquid metal, said probe comprising a metal tube supported by said vessel having its long leg open at its end externally of said vessel and having the end of its short leg capped, said tube being free of welds in the portion immersed in the liquid, two fine high resistance leads extended into said probe through said open end and electrically connected to said cap, said leads being insulated from said metal tube and from each other, said leads being made of the same material as said tube, and means including one of said leads for measuring the voltage drop developed by passing a constant D.-C. current through the other lead and the portion of the unsupported leg of the probe that is not submerged in liquid metal.

6. In combination, an electrically conducting vessel adapted to contain liquid metal at varying level, means for indicating the liquid level in said vessel including a J probe extended into the liquid metal in said vessel with its shorter leg normally protruding above the surface of the liquid metal, said probe comprising a metal tube having its longer leg supported at its upper end by said vessel, two fine high resistance wires of the same metal as said tube extending through the length of said tube and insulated therefrom except at the end of said shorter leg where they are connected together and electrically connected to the tube of said probe, said tube being provided with a fluid tight closure at this point of connection, a power source connected across one of said wires and said vessel, a potentiometer connected across the other of said wires and said vessel, and means external of said probe for holding the voltage drop constant across that portion of the probe circuit connected to said power source which portion is in the same temperature environment as said probe and which is made of the same material as said tube, whereby the output from the probe will be temperature independent.

7. The method of making a J probe for continuously measuring the level of high temperature liquid metals in a container comprising the steps of fabricating a straight stainless steel tube of sufficient length to make several probes with at least two fine wires therein which are insulated from the tube by ceramic bead insulating material, swaging said tube to reduce its diameter and compact said insulation about said wires, cutting off a length of said swaged tube sufficient for a J probe, cutting back said tube and its insulation at one end of said cut length of tube, baring the internal wires to form leads for the base end of the probe, bending said tube into the desired J configuration, welding the ends of the wires at their other ends to the clad, and forming a closure of the tube at this end.

8. Apparatus for gauging the level of a liquid metal in a container including a J probe having a base leg which is supported on the container and terminates externally of the container and a short leg which protrudes through the surface of the liquid, said probe comprising a metal clad enclosing two fine high resistance wires of the same material as the clad, said wires being insulated from the clad and from each other by compressed ceramic-bead insulation, means for forming a fluid-tight closure at the end of said short leg including a weld which also connects said wires to the clad at the end of the probe, a two-lead power source having one lead grounded on the container and the other lead connected to one wire of said probe, a millivolt potentiometer having one lead grounded on the container and its other lead connected to the other of said wires, and means wholly external of said probe for maintaining the voltage constant across said container and said other lead of said probe where the latter enters said base leg.

References Cited by the Examiner
UNITED STATES PATENTS

| | | | |
|---|---|---|---|
| 2,677,172 | 5/54 | Oakley | 29—155.65 |
| 2,797,284 | 6/57 | Brooke | 73—304 |
| 2,884,785 | 5/59 | Byards | 73—304 |
| 2,894,390 | 7/59 | Talbot | 73—304 |
| 3,001,105 | 9/61 | Fox | 18—59 |
| 3,082,511 | 3/63 | Louthan | 29—155.65 |

OTHER REFERENCES

Nuclear Process Instrumental and Control, pages 98, 119, 142, 143.

Nuclear Process Instrumentation and Controls Conference of May 20–22, 1958; Report dated April 22, 1960, by Oak Ridge National Laboratory and U.S. Atomic Energy Commission, pages 139–141.

Mechanical Measurements by Electrical Methods, by H. C. Roberts, page 141, published by The Instruments Publishing Co., Inc. of Pittsburgh in 1951.

ISAAC LISANN, *Primary Examiner.*